Jan. 30, 1962 T. LITTLE 3,019,283

PRINTED CIRCUIT BOARD

Filed April 29, 1959

Thomas Little,
INVENTOR.

BY S. J. Rotondi
A. T. Dupont
E. R. Mackert
W. P. Murphy,

United States Patent Office 3,019,283
Patented Jan. 30, 1962

3,019,283

PRINTED CIRCUIT BOARD

Thomas Little, 2230 Gallatin St. SW., Huntsville, Ala.

Filed Apr. 29, 1959, Ser. No. 809,888
2 Claims. (Cl. 174—68.5)
(Granted under Title 35, U.S. Code (1952), sec. 266)

The invention described herein may be manufactured and used by or for the Government for governmental purposes without the payment of any royalty thereon.

My invention relates to printed electric circuits, and more particularly, to preformed boards for fabrication of such circuits.

Conventional printed circuits comprise units including boards with conducting plates and insulating plates respectively secured thereto. The conducting plates are etched to form conductors of the circuits and the insulating plates are provided with the thickness required to support the units. Terminals soldered to the conductors project through apertures in the boards for connection on the opposite surfaces thereof to elements of the circuits.

The circuits usually are laid out on graph paper and the terminal apertures located in accordance with the layout graph. After etching, the terminal holes are individually drilled, and the drilling operation is long and tedious.

It is an object of my invention to provide boards for fabrication of printed circuits with the boards preformed with apertures therein for projection of terminals of the circuits therethrough.

Another object of my invention is to provide such boards with the apertures spaced in a rectangular grid therein.

A further object of my invention is to provide such boards in which the grids and the design graphs of the circuits are similarly spaced.

A still further object of my invention is to provide an alternate embodiment thereof in which an insulating layer is secured between the conducting and insulating plates and disposed for rupture upon insertion of the terminals in the apertures.

Other aims and objects of my invention will appear from the following explanation.

In carrying out my invention, single layers of conducting and insulating material are secured together to form boards, and the boards are cut into supporting mounts for the individual circuits. The insulating layer is provided with the thickness required to support the units and preformed with apertures for mounting the terminals of the circuits.

The apertures are disposed in rectangular grid relation in the insulating layer with the grid corresponding to the design graph of the circuit.

In an alternate form of the invention a layer of insulation material is secured between the conducting and insulating layers and disposed for rupture responsive to insertion of the terminals in the apertures.

For more complete understanding, reference is directed to the following description and the accompanying drawing, in which, FIGURE 1 is an elevation of one embodiment of my invention;

Figure 1:
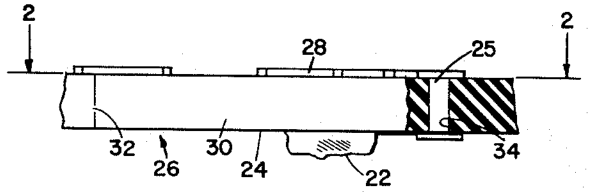
Figure 5:
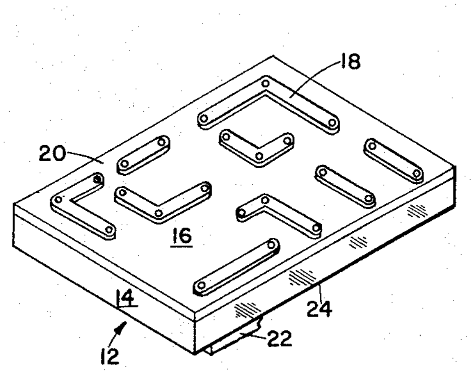
FIGURE 5 is a perspective view of a printed circuit unit incorporating the alternate embodiment.
Figure 2:
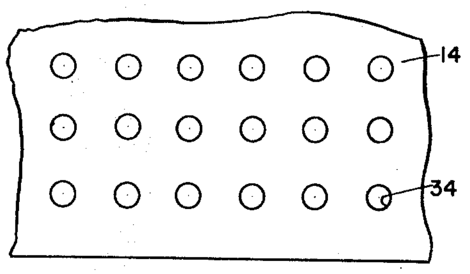
FIGURE 2 is a view along line 2—2 of FIGURE 1.

Accordingly a printed circuit unit 12 includes a mount 14 with a circuit 16 secured thereto and provided with conductors 18 secured to one surface 20 of mount 14 and members 22, such as inductive, capacitive, and resistive members of circuit 16 secured to opposite surface 24 of the mount. Terminals 25 connect conductors 18 and members 22.

Mount 14 is fabricated from a board 26 with a conducting plate 28 secured to a supporting plate 30 of insulating material. Board 26 is provided with thickness 32 required to support the members of a printed circuit unit 12.

Board 26 is preformed with terminal apertures 34 spaced therein in a rectangular grid corresponding to the graphs upon which units are designed. The board is cut to provide a mount 14 for the unit, conducting plate 28 is etched to form conductors 18, and terminals 25 are disposed in appropriate apertures 34 and secured to conductors 18. Members 22 are secured to the opposite surface of mount 14 and connected to the respective terminals to complete unit 12.

Figure 4:
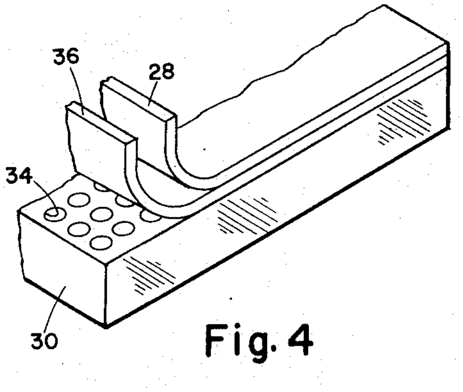
FIGURE 4 is a perspective view of the alternate embodiment with the conducting and insulating layers peeled therefrom.
Figure 3:
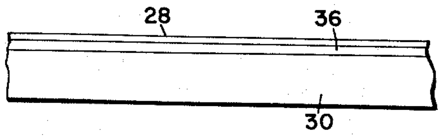
FIGURE 3 is an elevation of an alternate embodiment of my invention.

In the alternate embodiment of FIGURE 4 an insulating sheet 36 is secured between the conducting and supporting plates, and sheet 36 is disposed to rupture for insertion of terminals 24 in apertures 34.

In a particular board of the alternate embodiment, a copper plate .002 inch thick is secured to a supporting plate substantially .050 inch thick.

In the alternate embodiment, an insulating sheet .010 thick is secured between the conducting and supporting plates for the puncture.

While the foregoing is a description of the preferred embodiments, the following claims are intended to include those modifications and variations that are within the spirit and scope of my invention.

I claim:

1. A board for fabrication of printed circuit patterns having terminal portions disposed in a rectangular grid pattern comprising: conducting and insulating plates secured together in coextensive relation; said insulating plate having a multiplicity of uniformly spaced preformed apertures therethrough disposed in accordance with said rectangular grid patterns; said conducting plate being disposed in coextensive relation with said insulating plate; said conducting plate being continuous and closing one end of each of said preformed apertures and selective ones of the terminal portions of said conducting plate being adapted to be provided with holes to receive selective terminal elements to electrically connect electrical members thereto.

2. A board for fabrication of printed circuit patterns having terminal portions disposed in a rectangular grid pattern comprising: conducting and insulating plates secured together in coextensive relation with said insulating plate having a multiplicity of uniformly spaced preformed apertures therethrough disposed in accordance with said rectangular grid patterns and in coextensive relation with said insulating plate; and a sheet of insulating material secured between said plates; said conducting plate and said sheet of insulating material being continuous and closing one end of each of said preformed apertures; selective ones of the terminal portions of said conducting plate being adapted to be provided with holes to receive selective terminal elements to electrically connect electrical members thereto; and said insulating material sheet being provided with thickness for rupture responsive to insertion of said selective terminal elements in the holes corresponding thereto.

References Cited in the file of this patent

UNITED STATES PATENTS

| | | |
|---|---|---|
| 2,734,150 | Beck | Feb. 7, 1956 |
| 2,883,447 | Dahl | Apr. 21, 1959 |
| 2,889,393 | Berger | June 2, 1959 |

FOREIGN PATENTS

| | | |
|---|---|---|
| 215,968 | Australia | July 10, 1958 |